United States Patent [19]

Lévesque

[11] 4,368,619

[45] Jan. 18, 1983

[54] CENTRIFUGAL CHAMBERS GAS TURBINE

[76] Inventor: Jean-Paul Lévesque, P.O. Box 568, Schefferville, County of Duplessis, Canada, G0G 2T0

[21] Appl. No.: 218,810

[22] Filed: Jan. 28, 1981

[30] Foreign Application Priority Data

Feb. 4, 1980 [CA] Canada .................................. 344976

[51] Int. Cl.³ .............................................. F02C 3/14
[52] U.S. Cl. .................................................... 60/39.35
[58] Field of Search ............ 60/39.16 C, 39.34, 39.35, 60/732, 733

[56] References Cited

U.S. PATENT DOCUMENTS

| | | | |
|---|---|---|---|
| 2,784,551 | 3/1957 | Karlby et al. ...................... | 60/39.35 |
| 2,831,320 | 4/1958 | Duncan ............................. | 60/39.35 |
| 2,890,570 | 6/1959 | Castles, Jr. . | |
| 3,037,352 | 6/1962 | Pavlecka . | |
| 3,321,911 | 5/1967 | Myles . | |
| 3,971,209 | 7/1976 | de Chair ............................ | 60/39.35 |

FOREIGN PATENT DOCUMENTS 547727 10/1957 Canada .
712764 7/1965 Canada .

Primary Examiner—Louis J. Casaregola

[57] ABSTRACT

A centrifugal chambers gas turbine is disclosed. The turbine comprises a housing, a main shaft mounted on the housing, a rotating cage rotatably mounted on the shaft, a primary combustion chamber mounted in the housing and comprising two concentric walls separated by a predetermined distance and having at one end an opening permitting entry of compressed gas into the combustion chamber, and at its other end, an opening for exhaust of combustion gases, means for securing the outside wall of the primary combustion chamber to the housing and the inside wall of the primary combustion chamber to the rotating cage, a secondary combustion chamber in communication at one end with the exhaust opening of the primary combustion chamber, and having a plurality of transverse vanes located at its other end through which the exhaust gases of the secondary combustion chamber are ejected, a rotating nozzle including a plurality of transverse vanes located at the output of the vanes of the secondary combustion chamber and secured to the inside wall of the primary combustion chamber for rotation of the inside wall of the primary combustion chamber, a compressor coupled to the rotating cage for compressing gas into the primary and secondary combustion chambers, and a turbine output wheel mounted for rotation on the main shaft and having a plurality of transverse blades located at the output of the transverse vanes of the primary combustion chamber and permitting rotation of such turbine output wheel.

6 Claims, 6 Drawing Figures

CENTRIFUGAL CHAMBERS GAS TURBINE

This invention relates to an internal combustion engine, and more particularly to a gas turbine engine.

Up to now, gas turbine engines have consisted of three main units, namely: a compressor, a combustion chamber and a turbine output wheel. Turbines with several compressors and several parallel combustion chambers with one or more output wheels, also exist. However, the efficiency of the known turbines has always been relatively low.

It is therefore the object of the present invention to provide a turbine having high efficiency and which is simple in construction, easily assembled and which may, in some low output models, be made portable.

The gas turbine in accordance with the invention comprises a housing, a main shaft mounted on the housing, a rotating cage rotatably mounted on the shaft, a primary combustion chamber mounted in the housing and comprising two concentric walls separated by a predetermined distance and having at one end an opening permitting entry of compressed gas into the combustion chamber, and at its other end an opening for the exhaust of combustion gases, means for securing the outside wall of the combustion chamber to the housing and the inside wall of the combustion chamber to the rotating cage, a secondary combustion chamber in communication at one end with the exhaust opening of the primary combustion chamber, and having a plurality of transverse vanes located at its other end, between which the exhaust gases of the secondary chamber are ejected, a rotating nozzle including a plurality of transverse vanes located at the output of the vanes of the secondary combustion chamber and secured to the inside wall of the primary combustion chamber for rotation of the inside wall of the primary combustion chamber, a compressor coupled to the rotating cage for compressing gas into the primary and secondary combustion chambers, and a turbine output wheel mounted for rotation on the main shaft and having a plurality of transverse blades located at the output of the transverse vanes of the primary combustion chamber and permitting rotation of such turbine output wheel.

The gas turbine is preferably provided with a diffuser located between the compressor and the input of the primary and secondary combustion chambers for directing compressed air into the primary and secondary combustiom chambers.

The gas turbine preferably comprises a plurality of variable pitch vanes rotated between the vanes of the rotating nozzle and the blades of the output wheel for controlling the speed of the turbine.

A second output shaft may also be connected to the rotating cage of the turbine for providing power for the turbine accessories.

The invention will now be disclosed, by way of example, with reference to the accompanying drawings, in which.

Figure 1:
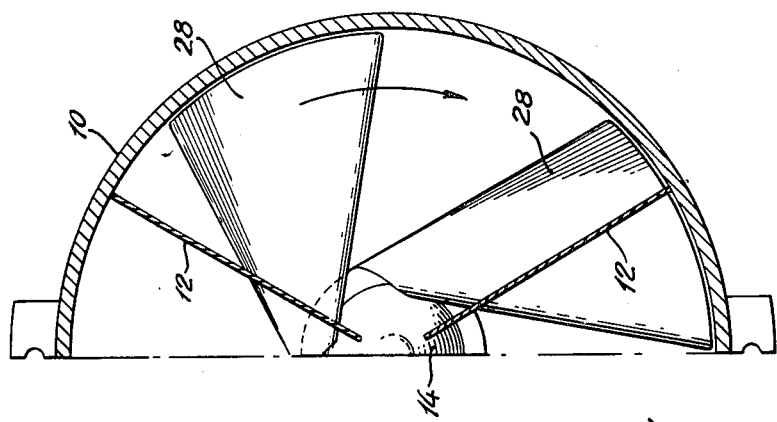
FIG. 1 illustrates a half-end view of the input end of a gas turbine in accordance with the invention.
Figure 2:
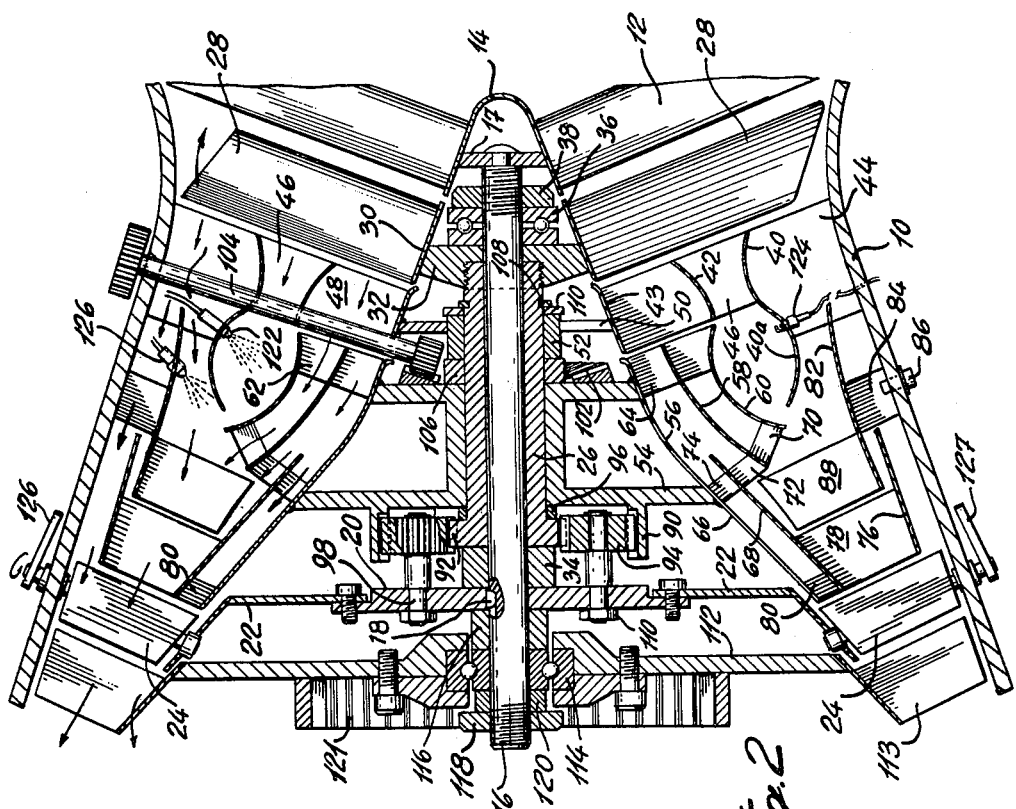
FIG. 2 illustrates a longitudinal section view through the axis of the gas turbine shown in FIG. 1.

Referring to the drawings, there is shown a gas turbine comprising a frusto-conical housing 10 provided at one end with a plurality of radial vanes 12 joined to a central cone 14. A main shaft 16 is secured at one end to a disc 17, which is itself secured to the central cone 14. The other end of the shaft is locked by means of a key 18 to a stator support 20, which is provided with a bent annular extension 22, at the extremity of which is rotatably mounted one end of the axles of variable pitch vanes 24, the other end of which axles is rotatably mounted on the housing 10.

A hollow shaft 26 is rotatably mounted on main shaft 16 and supports rotor blades 28, which form part of the compressor section of the gas turbine. The blades 28 are secured to a truncated cone 30, which is itself secured to an annular ring 32 threaded into the end of the hollow shaft 26. One end of the hollow shaft 26 is spaced from the stator support by a spacer 34 and the other end is prevented from longitudinal movement along the shaft axis during rotation by thrust bearing 36, which is locked by nut 38 on the main shaft 16.

Figure 3:
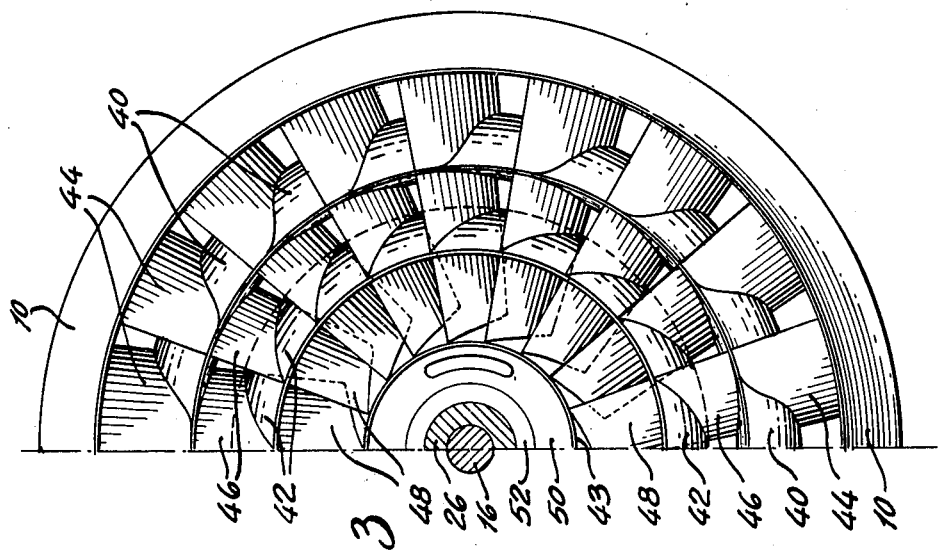
FIG. 3 shows a half-view of the diffuser portion of the gas turbine in accordance with the invention.
Figure 4:
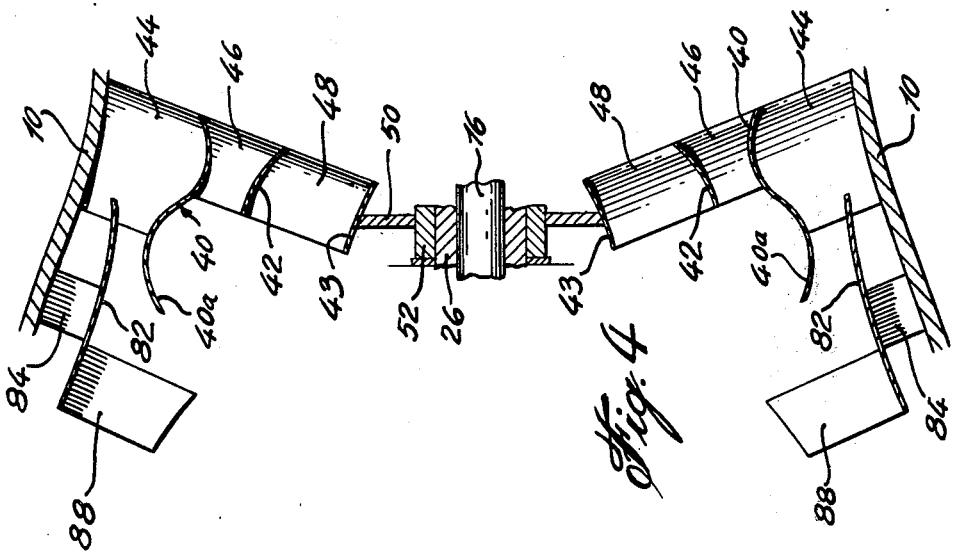
FIG. 4 illustrates a section view through the longitudinal axis of the diffuser of FIG. 3.

A diffuser section, which is shown separately in FIGS. 3 and 4, is secured to housing 10. The diffuser comprises three concentric walls 40, 42, and 43, which are joined by a plurality of radial vanes 44, 46, and 48 for directing compressed air through the various portions of the turbine. The outer vane 44 of the diffuser is secured to the housing 10, whereas the inner wall 43 is secured to a ring 50, which is itself secured to a sleeve 52 mounted on the hollow shaft 26.

Figure 5:
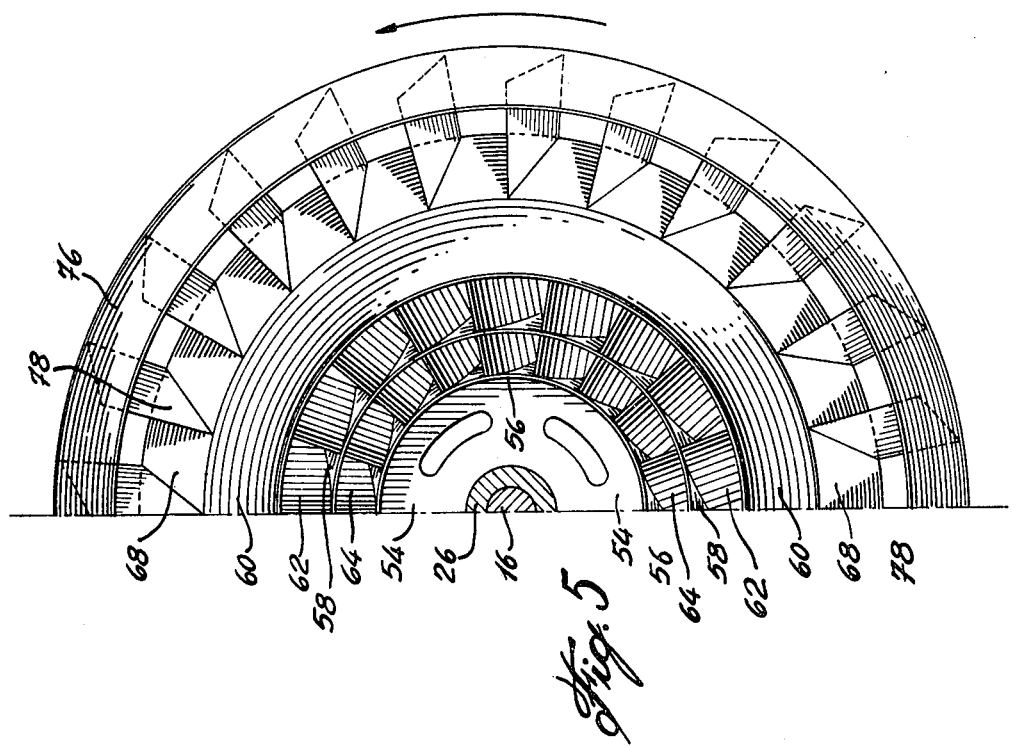
FIG. 5 illustrates a half-view of the rotating primary combustion chamber of FIG. 6.
Figure 6:
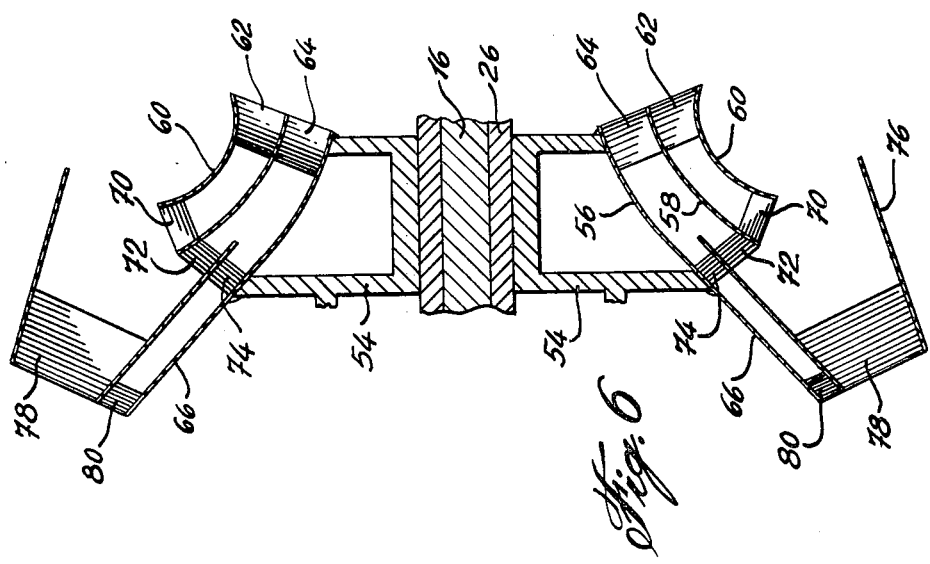
FIG. 6 illustrates a section view through the primary combustion chamber shown in FIG. 5.

Also mounted on the hollow shaft 26, as shown separately in FIGS. 5 and 6, is a rotating cage 54 upon which are mounted three concentric walls 56, 58, and 60 separated by vanes 62 and 64 at one end of the walls. The inside wall 56 has an extension 66, which is surrounded by another wall 68. The other end of walls 58 and 60 and one end of walls 66 and 68 are separated by vanes 70, 72 and 74. Another concentric wall 76 is mounted outside of wall 68 and the two walls are joined by vanes 78. The remote end of walls 66 and 68 are joined by vanes 80. Walls 56, 58 and 60 and vanes 78, which are attached to rotating cage 54, form a rotating nozzle which is driven by the output gases of the primary combustion chamber. Wall 40 of the diffuser has an extension 40a which forms the fixed wall of the primary combustion chamber. Compressed air is fed into the combustion chamber by means of vanes 46 located between concentric walls 40 and 42 of the diffuser.

A secondary combustion chamber is formed in the turbine at the exit of the first combustion chamber between an outside wall 82 which is secured to the housing 10 by means of brackets 84 and bolts 86 and the rotating part of the primary combustion chamber. Compressed air is directed into the secondary combustion chamber between walls 40 of the diffuser and the housing 10. Additional air is also fed to the secondary combustion chamber from between walls 42 and 43 of the diffuser and between walls 56, 58, and 60 of the primary combustion chamber. A plurality of vanes 88 are secured to wall 82 for directing the combustion gases of the secondary combustion chamber onto the vanes 78 of the primary combustion chamber to cause rotation of the primary combustion chamber.

The cage 54 is provided with a ring gear 90 which is coupled to a sun gear 92 of the hollow shaft 26 through the planet gears 94. The sun gear 92 is spaced from the cage 54 by spacer 96. The planet gears 94 are mounted on the stator support 20 through shafts 98 and nuts 110. An accessory drive gear 102 is also mounted on cage 54 and a drive shaft 104 is coupled to such gear for driving the accessories of the turbine. A spacer 106 is positioned between the cage 54 and the sleeve 52 of the diffuser. The ring sleeve of the diffuser is held in place by a snap-ring 108 bearing against a further spacer 110.

A turbine output 112, provided with blades 113, is rotatably mounted on main shaft 16 through bearing 114. The output wheel is spaced from the stator support 20 by spacer 116. The stationary part of the bearing is secured to the main shaft by nut 118 through spacer 120. A ring gear 121 is secured to the output wheel for connection to a load.

The above disclosed gas turbine operates as follows:

When the turbine is running, air is pushed into the engine by means of the compressor blades 28. The air is thus forced under pressure through the diffuser which directs air into the combustion chamber and against the walls of the engine for cooling purposes. The primary combustion chamber is provided with a fuel injection 122 and the air-fuel mixture is initially ignited by spark plug or glow plug 124, as it is well known in the art. Combustion causes the gases to expand inside the primary chamber and the combustion gases escape at high velocity through the secondary combustion chamber and hit the vanes 78 of the primary combustion chamber. Such vanes are positioned at an angle with the flow of combustion gases, thus causing the primary combustion chamber and cage 54 to rotate. Rotation of the cage 54 drives the shaft 26 through gears 90,92,94 and the compressor blades 28 to continue pumping air into the combustion chamber. The rotation of the primary chamber causes the fuel hitting rotating wall 60 of the chamber to be more thoroughly pulverized and increases combustion. Rotation of the primary chamber also increases turbulence within the combustion chamber to render the air-fuel mixture more homogeneous and improves combustion. The rotation of the primary combustion chamber also increases the velocity of the combustion gases escaping therefrom due to centrifugal action and, thus, the speed of rotating nozzle.

The secondary combustion chamber is provided with injectors 126 and air is also directed into it by means of the diffuser. Air under increased pressure, due to the rotation of the primary chamber, is also directed into the secondary chamber between walls 56 amd 58 and vanes 62, 64, 70, and 72 to create greater pressure and greater turbulence in the secondary chamber. In addition, the air of the secondary combustion chamber is warmed up to a high temperature by the combustion gases of the primary combustiom chamber, thus increasing efficiency of the turbine. This also permits the use of heavier fuel or even water, if desired, in the secondary combustion chamber to save energy.

The combustion gases escaping from the vanes 78 of the primary combustion chamber are directed to the vanes 113 of the output wheel for diving any useful load. The flow of the combustion gases is controlled by varying the angular position of vanes 24 through a lever 128.

It will thus be easily seen that the combination of a rotating primary combustion chamber which discharges into a secondary combustion chamber, provides more efficient combustion due to the improved fuel atomization and also to an air-fuel mixture which is more homogeneous than that provided with the known turbines. In addition, the provision of a secondary combustion chamber which is heated by the exhaust gases of a primary combustion chamber, increases combustion in such secondary chamber and thus improves the efficiency of the turbine.

Although the invention has been disclosed with reference to a preferred embodiment, it is to be understood that it is not limited to such embodiment and that other alternatives are also envisaged.

What I claim is:

1. A gas turbine comprising:
   (a) a housing:
   (b) a main shaft mounted in said housing;
   (c) a rotating cage rotatable on said shaft;
   (d) a primary combustion chamber mounted in said housing and comprising two concentric walls separated by a predetermined distance and having at one end an opening permitting entry of compressed gas into the combustion chamber, and at its other end an opening for the exhaust of combustion gases;
   (e) means for securing the outside wall of said combustion chamber to said housing and the inside wall of said combustion chamber to said rotating cage;
   (f) a secondary combustion chamber in communication at one end with the exhaust opening of the primary combustion chamber and having a plurality of transverse vanes located at its other end through with the exhaust gases of said secondary combustion chamber are ejected;
   (g) a rotating nozzle including a plurality of transverse vanes rotated at the output of the vanes of said secondary combustion chamber and secured to the inside wall of said primary combustion chamber for rotation of the inside wall of the primary combustion chamber;
   (h) a compressor coupled to said rotating cage for compressing gas into the primary and secondary combustion chambers; and
   (i) a turbine output wheel mounted for rotation on said main shaft and having a plurality of transverse blades located at the output of the transverse vanes of said primary combustion chamber and permitting rotation of said turbine output wheel.

2. A gas turbine as defined in claim 1, further comprising a diffuser located between the compressor and the input of the primary combustion chamber for directing compressed gas into the primary combustion chamber.

3. A gas turbine as defined in claim 2, further comprising additional vanes in said diffuser of directing compressed gas into said secondary combustion chamber.

4. A gas trubine as defined in claim 3, further comprising a planetary gear system coupling the rotating cage to the compressor to rotate said cage and compressor in opposite directions and at different speeds.

5. A gas turbine as defined in claim 1, further comprising a plurality of variable pitch vanes located between the vanes of the rotating nozzle and the blades of said output wheel for controlling the speed of the turbine.

6. A gas turbine as defined in claim 1, further comprising a second output shaft connected to said rotary cage for providing power for the turbine accessories.

* * * * *